United States Patent
Gryspeerdt et al.

(10) Patent No.: US 6,485,364 B1
(45) Date of Patent: Nov. 26, 2002

(54) REMOVABLE CONCAVES FOR AXIAL FLOW COMBINES

(75) Inventors: José G. T. Gryspeerdt, Poesele (BE); Eric L. A. Cromheecke, Bredene (BE); Barry E. Lehman, York, PA (US); Eric P. J. Van Quekelberghe, Moerkerke (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/857,812
(22) PCT Filed: Nov. 24, 2000
(86) PCT No.: PCT/EP00/12070
§ 371 (c)(1), (2), (4) Date: Jun. 11, 2001
(87) PCT Pub. No.: WO01/37637
PCT Pub. Date: May 31, 2001

(30) Foreign Application Priority Data

Nov. 26, 1999 (GB) .................................. 9927839

(51) Int. Cl.[7] .................................. A01F 12/24
(52) U.S. Cl. .................................. 460/107; 460/109
(58) Field of Search .................................. 460/109, 107, 460/69, 71, 72, 79, 80, 81, 83, 108, 120

(56) References Cited

U.S. PATENT DOCUMENTS

| 3,470,881 A | * | 10/1969 | Knapp et al. | 460/109 |
| 3,568,682 A | * | 3/1971 | Knapp et al. | 460/108 |
| 3,631,862 A | * | 1/1972 | Rowland-Hill et al. | 460/109 |
| 3,669,121 A | * | 6/1972 | Rowland-Hill | 460/69 |
| 3,871,384 A | * | 3/1975 | Depauw et al. | 460/109 |
| 3,957,058 A | * | 5/1976 | Komancheck | 460/108 |
| 4,136,704 A | * | 1/1979 | Dyke | 460/68 |
| 5,489,239 A | * | 2/1996 | Matousek et al. | 460/62 |

FOREIGN PATENT DOCUMENTS

| EP | 0241981 | * | 4/1987 | A01F/12/28 |
| EP | 0244007 | * | 4/1987 | A01F/12/24 |
| EP | 0841001 | * | 5/1998 | A01F/12/24 |
| FR | 2234849 | * | 6/1974 | A01F/12/24 |

* cited by examiner

Primary Examiner—Thomas B. Will
Assistant Examiner—Árpád Fábián Kovács
(74) Attorney, Agent, or Firm—John William Stader; Larry W. Miller

(57) ABSTRACT

A combine harvester comprises a threshing and separating arrangement mounted to a main firm and including a generally cylindrical chamber having a generally longitudinal axis. Part of the chamber is constituted by a separating concave assembly comprising at least two separating concaves, the one located behind the other. The concaves are taken from a choice of less and more aggressive separating concaves. The chamber comprises mounting device operable to receive and hold each of the separating concaves. The front and/or the rear concaves can be removed and replaced.

5 Claims, 4 Drawing Sheets

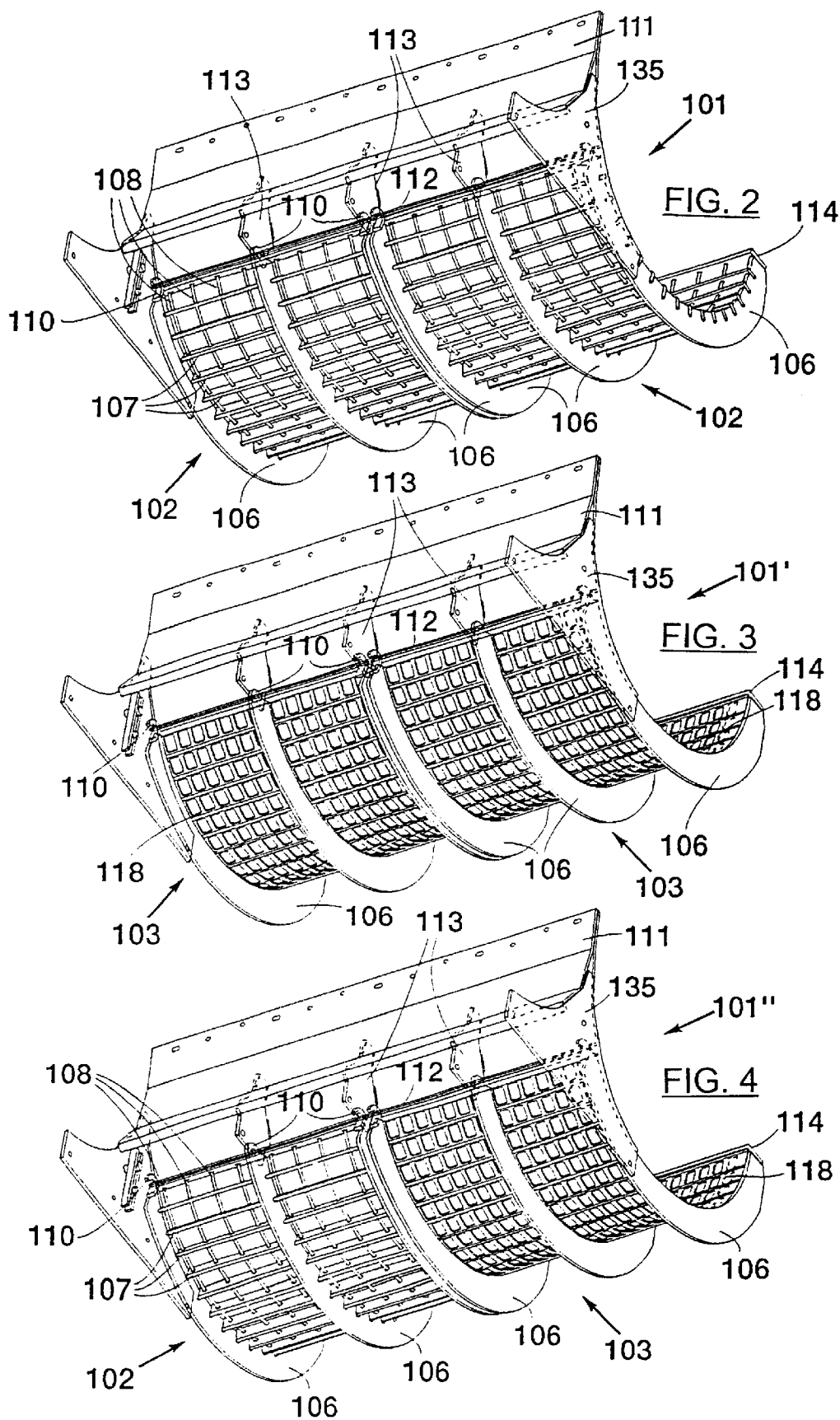

REMOVABLE CONCAVES FOR AXIAL FLOW COMBINES

TECHNICAL FIELD OF THE INVENTION

The present invention relates to agricultural harvesters and, more particularly, to axial flow combine harvesters having a threshing and separating unit with at least one generally longitudinally arranged rotor for advancing crop material along a generally helical path.

BACKGROUND ART

In conventional combine harvesters crop material is fed between a threshing cylinder and an associated threshing concave, which extend transversely to the direction of combine travel. Hereby the crop is threshed over a comparatively short distance. Axial flow machines use one or more longitudinally arranged rotors and associated concaves. Herein, crop material is subjected to a much longer threshing and separating action than in a conventional machine and therefore, the efficiency of axial flow machines is greater because a higher degree of separation is reached and the grain losses are reduced.

The owner wants to maximise the use of his combine harvester. Hence he desires to adapt it to a wide range of crops and crop conditions, such that the harvester can operate during an extended harvesting season.

On known axial flow combines the possibilities for changes are limited. Rotor speed and concave clearance may be adapted quite easily, but the concaves themselves are not that easily removed and replaced.

Accordingly there is a need for a versatile threshing and separating arrangement which makes it possible to adapt the combine harvester to a wide range of crops and crop conditions in a swift and effective manner.

SUMMARY OF THE INVENTION

According to one aspect of the present invention there is provided a combine harvester comprising:
  a main frame;
  a threshing and separating arrangement mounted to said main frame and including:
    a generally cylindrical chamber having a generally longitudinal axis and comprising a separating concave assembly; and
    a rotor assembly mounted for rotation in said chamber and comprising a generally cylindrical rotor body with a separating section associated with said separating concave assembly;
  characterised in that:
  said separating concave assembly comprises at least two separating concaves, the one located behind the other and taken from a choice of less and more aggressive separating concaves;
  said chamber comprises mounting means operable to receive and hold each of said choice of separating concaves.

This structure enables the mounting of various types of concaves at the front and rear ends of the separating section, in order to adapt the combine to a wide range of harvesting conditions and crops.

Preferably the front and rear sections have identical mounting means, such that the same concave can be installed at wish in a front or rear position in the concave assembly. Hence there is no need for dedicated front or rear concaves, and before the end of their lifetime, the more worn front concaves can be exchanged with the less worn rear concaves.

The concaves may be of the more aggressive type comprising a grate constituted by spaced, longitudinally arranged slats and a set of curved wires extending transversely through the slats. They may also be of the more gentle type comprising a grate constituted by a curved plate having substantially rectangular apertures therein.

When the threshing and separating arrangement comprises left and right chambers, the separating concaves and their mounting means preferably are symmetrical with respect to their transverse middle plane, such that the concaves can be mounted invariably to the left or right chambers. This allows for reversal of the concaves after or during the harvesting season, such that the front, most worn part of the concave is turned to the rear of the chamber.

A similar structure can be applied to the threshing concaves at the front end of the chambers.

According to another aspect of the present invention there is provided a combine harvester comprising:
  a main frame including side walls;
  a threshing and separating arrangement mounted to said main frame and including a generally cylindrical chamber having a generally longitudinal axis and comprising a concave assembly comprising at least one removable concave; and
  a cleaning assembly arranged below said concave assembly;
  characterised in that
  at least one side wall has an aperture therein for passing therethrough said removable concave, and a panel for closing said aperture; and
  said combine harvester further comprises transverse rest means arranged between said side walls and between said threshing and separating arrangement and said cleaning assembly for resting thereon said removable concave during installation or removal of said concave.

Preferably the rest means are provided with an opening permitting the passage of threshed and/or separated grain to the cleaning assembly.

In one embodiment the rest means comprise a pair of transverse supports, extending between the side walls. In a preferred embodiment the supports are constituted by tubular members connected at their ends to side mounting members. The front support may extend at a lower level than the rear support, in order to adapt to the longitudinal inclination of the threshing and/or separating concave.

DESCRIPTION OF THE FIGURES

A combine harvester in accordance with the present invention will now be described in greater detail, by way of example, with reference to the accompanying drawings, in which:

FIGS. 2 to 4 are perspective views, illustrating various modifications to the separating grates of the rear section of the threshing and separating unit of FIG. 1;

DETAILED DESCRIPTION OF AN EMBODIMENT OF THE INVENTION

The terms "grain", "straw" and "tailings" are used principally throughout this specification for convenience and it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
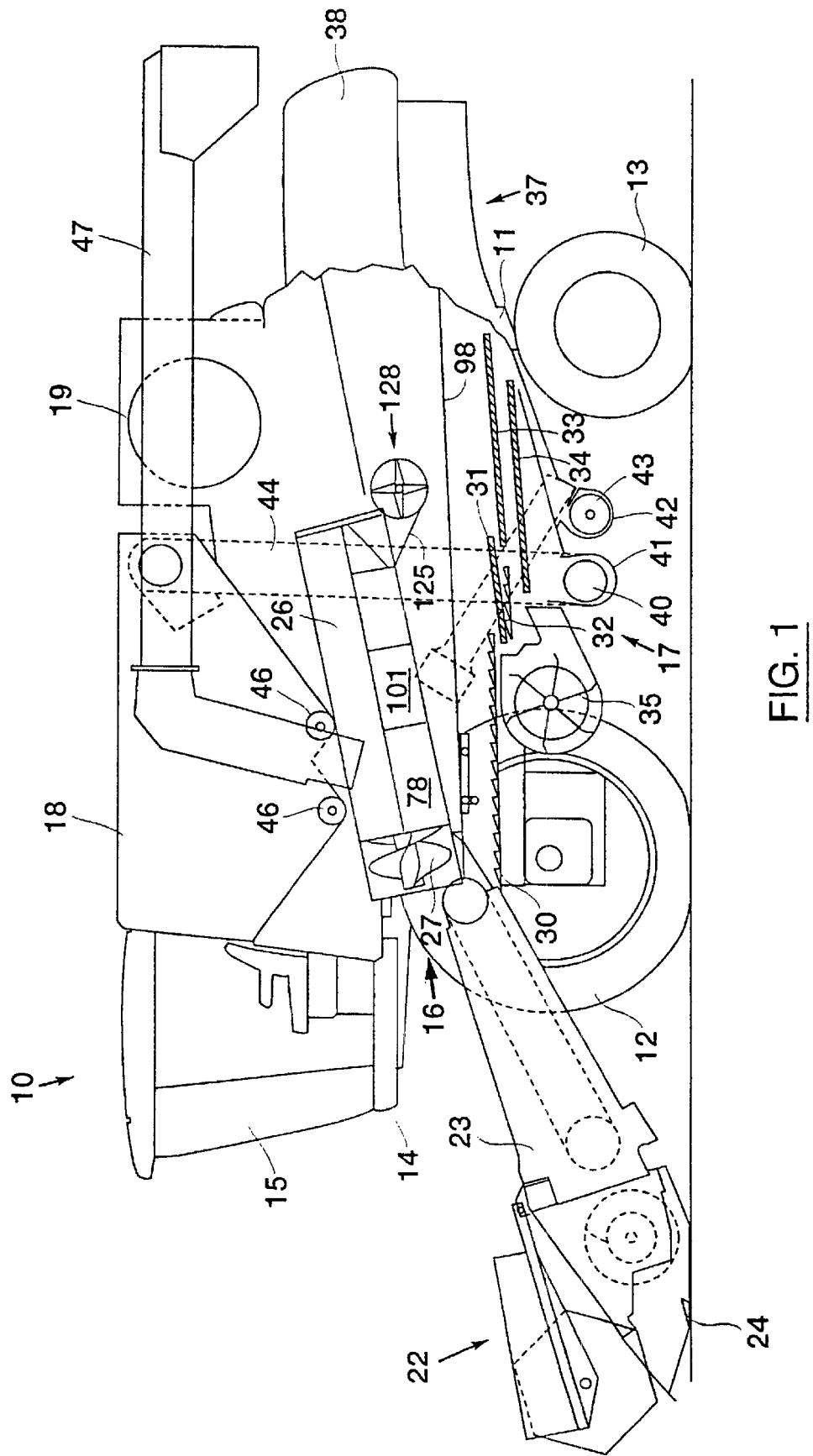
FIG. 1 is a diagrammatic, partly sectional side view of a combine harvester having an axial flow threshing and separating unit.

The combine harvester 10 shown in FIG. 1 of the accompanying drawings, is of the axial-flow type, wherein crop material is threshed and separated while it is advanced by and along a longitudinally arranged rotor. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional header 22 and straw elevator 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22, whereafter the header and the straw elevator 23 supply the cut crop to the threshing and separating assembly 16.

The threshing and separating assembly 16 comprises a pair of juxtaposed, generally cylindrical chambers 26 in which rotors 27 are rotated to thresh and separate the crop received therein, that is to say, the crop is rubbed and beaten between the rotors 27 and the inner surfaces of the chambers 26, whereby the grain, seed or the like, is loosened and separated from the straw. The chambers and the rotors are described in further detail hereinafter. The threshed straw is conveyed rearwardly to the outlet of the chamber 26 and deposited onto a slanting guide plate 125. A beater assembly 128 at the end of the guide plate engages the straw delivered thereto and propels it through an outlet 37 at the rear of the combine harvester 10.

Grain which has been separated by the threshing and separating assembly 16 falls onto a first grain pan 30 of the cleaning assembly 17 which further also comprises a pre-cleaning sieve. 31, positioned above a second grain pan 32, a pair of sieves 33, 34, disposed the one above the other, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor to the cleaning assembly 17 for repeated cleaning action.

A pair of grain tank augers 46 at the bottom of the grain tank 18 is used to urge the clean grain sideways to an unloading tube 47 for discharge from the combine harvester 10.

Figure 5:
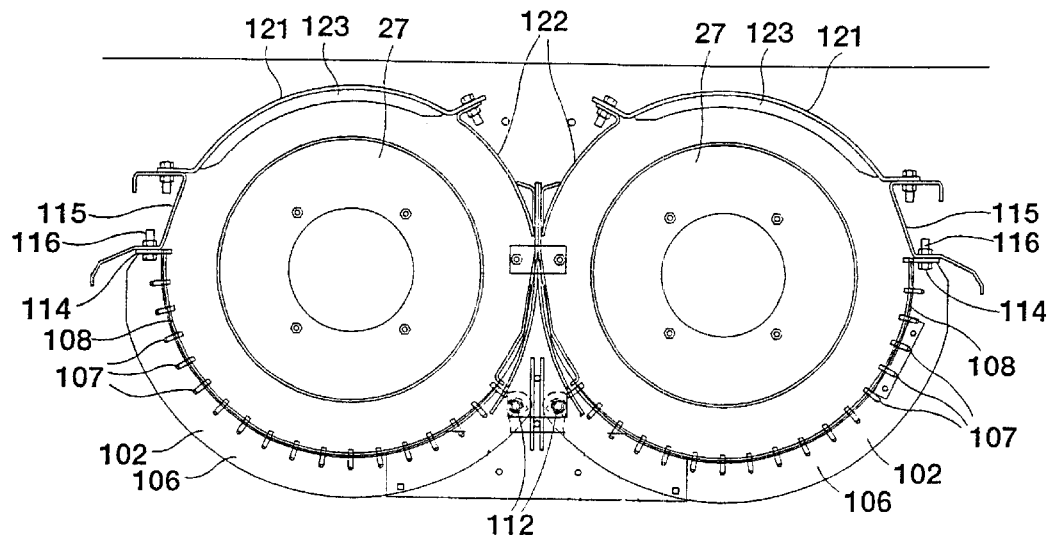
FIG. 5 is a rear view of the threshing and separating unit of FIG. 2.

The upper section of the threshing and separating chambers 26 comprises curved cover plates 121 as shown in FIG. 5. The cover plates 121 extend between and are bolted to the longitudinal profiles 115 and inner side walls 122 of the separating assembly 16. Each cover plate 121 is provided at its inner surface with a set of parallel vanes 123 which are arranged along spiral paths.

Figure 6:
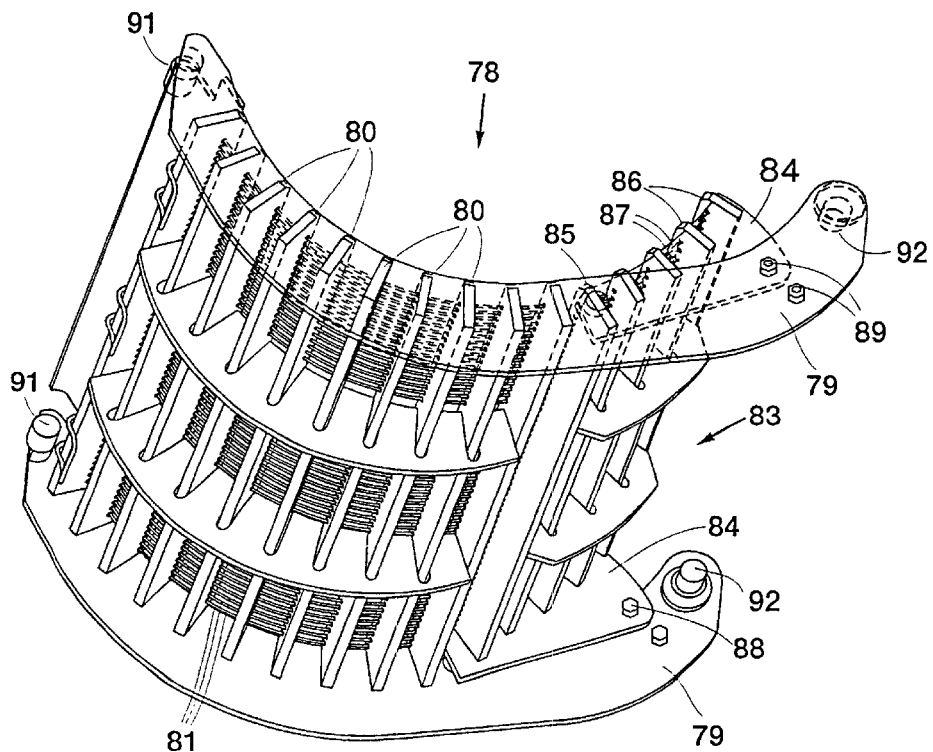
FIG. 6 is a perspective view of the threshing concave of the front section of the threshing and separating unit of FIG. 1.

The lower part of the chamber 26 comprises a plurality of concaves or gates allowing the passage of threshed and separated grain to the cleaning assembly 17. The front portion has a threshing concave assembly 78 which is disposed adjacent the threshing section of the rotor 27. As shown in FIG. 6, this concave assembly has a pair of curved side members 79 which hold a plurality of threshing bars 80, extending longitudinally in the fore-and-aft direction of the combine. The bars 80 are arranged in a circular pattern matching the path of the rasp bars on the rotor 27. The concave assembly 78 further has a plurality of transverse, caved wires 81 which pass through apertures in the threshing bars 80.

The outer portion of the threshing concave assembly 78 comprises a movable concave section 83 disposed between the outer ends of the side members 79. This concave section comprises a pair of side plates 84 which are interconnected by a set of longitudinally arranged threshing bars 86. Also these bars 86 have apertures through which curved wires 87 extend in alignment with the wires 81 of the inner concave section. The side plates 84 have near their inner ends a mounting member in the shape of an inverted U (not shown), which fits over pivots 85 welded to the inside of the side members 79. The outer ends of the side plates 84 are fixed by a bolt 88 to one of a pair of weld nuts 89 provided to the outer end of the side members 79. This enables the mounting of the movable concave section in an upper "in" and a lower "out" position. The "in" position will be used for intensified threshing operation, when handling crops which are hard to thresh, while the "out" position is recommended for easily threshable material.

The threshing concave assembly 78 is mounted to the harvester 10 by means a pair of inner pins 91, attached to the inner ends of the side members. 79, and a pair of outer pins 92 attached to the outer sides of these side members. The inner pins 91 are received in horizontal slots (not shown) provided in the central framework of the threshing and separating assembly 16 and the outer pins 92 are removably connected by a latch mechanism to a sideways adjustable member, as described in EP-A-0.841.001, incorporated herein by reference. This arrangement allows for transverse adjustment of the gap between the rasp bars 61, 62 of the rotor 27 and the threshing bars 80 of the concave assembly 78. The central framework holding the inner pins 91 can be raised or lowered on-the-go to adjust the gap during harvesting operations.

It is indicated that the concave assembly 78 is symmetrical in the fore-and-aft direction with respect to its middle transverse plane. In particular, the front and rear pins 91, 92 are symmetrical. Accordingly the left and right concave assemblies 78 which are mounted to the left and right halves of the threshing and separating assembly 16 are perfectly interchangeable. This is particularly advantageous when the concaves have been used for a substantial time and the threshing bars 80 get worn. Especially the leading portions of the bars 80 will wear off, while the wear of the trailing portion is substantially less. The symmetrical structure of the concave assemblies 78 allows for the interchange of the left and right concaves such that their worn off portions are now located at the rear end of the threshing section 57. The better, more aggressive parts of the bars 60 are now at the entrance of the threshing section 57, such that adequate threshing can resume, without having to replace the two concave assemblies 78. Accordingly their lifetime is extended substantially.

It is also conceivable to provide threshing concaves which are also symmetrical with respect to their longitudinal middle plane. Such concaves can be reversed and reinstalled in their initial left and right locations. In this case it is not needed to switch the left and right concaves. Such embodiment can also be used in threshing assemblies having only one longitudinal rotor.

Figure 7:
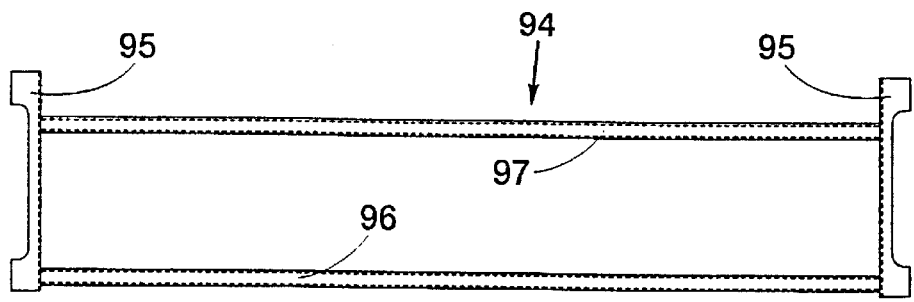
FIGS. 7 and 8 are top and front views, respectively, of a removal tool for the threshing concave.
Figure 8:
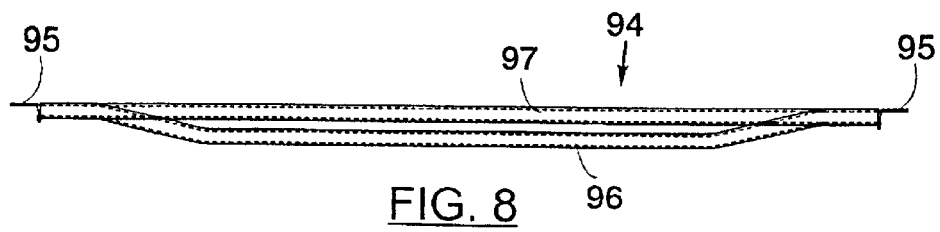
Figure 9:
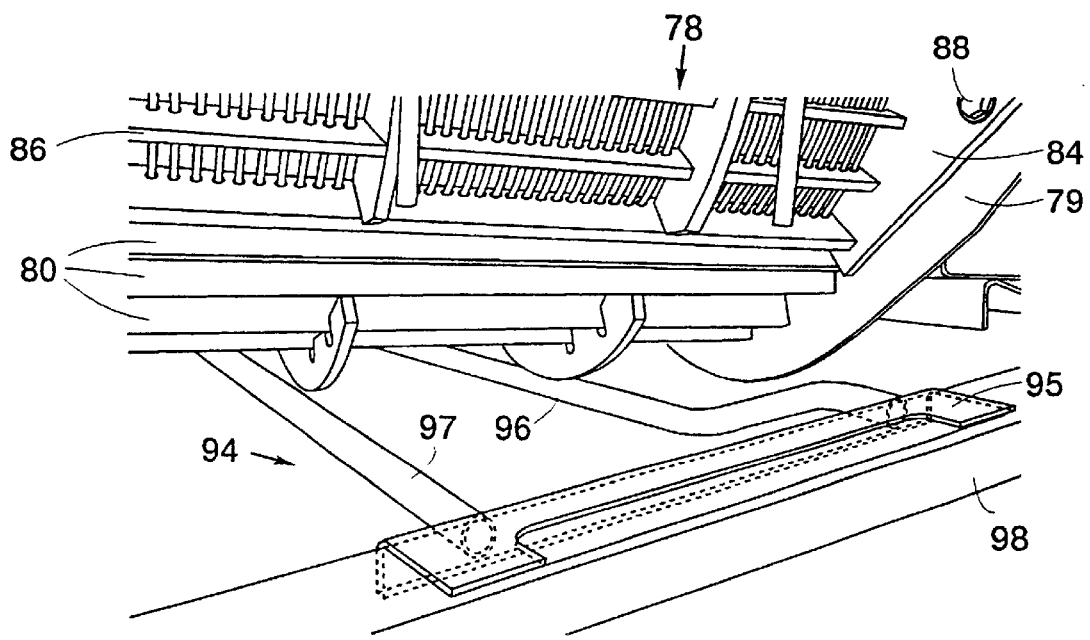
FIG. 9 is a perspective view of the area below the threshing concave, showing the location of the removal tool of FIGS. 7 and 8.

Removal and installation of the threshing concave assemblies 78 are facilitated by a concave rest structure 94 provided below the threshing section 57 and above the cleaning assembly 17. As shown in FIGS. 7-9, the rest structure 94 comprises a pair of angled irons 95 interconnected by a pair of transverse tubes 96, 97. The angle irons rest on longitudinal beams 98 of the main frame 11 on both sides of the combine harvester 10. The wall panels adjacent the threshing section are removable for providing access to the concave assemblies 78. The tubes 96, 97 span the full width of the cleaning assembly 17, bat because of their small diameter they do not affect the flow of threshed crop material from the threshing concave assemblies 78 to the front grain pan 30. They equally do not affect the flow of threshed material over the grain pan 30. The rear tube 97 is straight, but the front tube 96 is bent twice near its outer ends such that its middle portion extends at a lower height the rear tube 97. The inclination angle of the plane through the middle portions of the tubes 66, 67 matches the inclination angle of the threshing and separating assembly 16, and more particularly, the angle at which the concave assemblies 78 are disposed.

For disassembly of a concave assembly 78, the side wall panel is removed and the central framework of the threshing assembly 16 is lowered to move the concave assembly 78 to its lowermost position. In this position the lower edges of the threshing bars 86 extend a short distance above the tubes 96, 97. Now the pins 92 at the outer ends of the concave side members 79 are released and the concave assembly 97 is rotated downwardly about its inner pins 91 until it contacts the rest structure 94.

While some of the threshing bars 80 rest on the tubes 96, 97, full access is now provided to the movable concave section 83. The bolts 88 are removed from its end plates 84 to release the same. Now the inner portion of the concave section 83 can be lifted up to remove the mounting members from the pivots 85 such that the removable section can be pulled out of the combine harvester 10. In this manner the weight of the remaining parts of the concave assembly 78 is reduced substantially, enabling a more ergonomic handling thereof.

Thereafter the concave assembly 78 is slid sideways on and along the tubes 96, 97, thereby pulling the inner pins 91 out of their horizontal mounting slots provided in the central framework. During this movement, the concave assembly 78 is kept from sliding forwards by its curved side members 79 at the sides, which hook behind the tubes 96, 97. In this manner the threshing concave can be brought in a safe and efficient manner to the side of the harvester without any other dedicated hoist or lift tools. From there, one man easily can take the concave assembly 78 out of the harvester 10 through the opening in the side wall for repair or replacement of the concave.

The rest structure 94 serves in an analogous way while mounting the same or another threshing concave assembly 78 to the threshing assembly 16. At first the central framework of the assembly is lowered (in case it was not yet at its lowermost position). Then the concave assembly 78 is introduced through the side opening to rest on the tubes 96, 97. The concave is then slid inwardly until its inner pins 91 fit into horizontal slots of the central framework. Now the movable concave section 83 can be reinstalled. Thereafter the outer pins 92 are connected by the latch mechanism to the adjustable member near the side panel of the harvester 10. Finally the central framework is raised to move the concave assembly 78 to its operative position. Also these operations can be performed without use of any other loose, dedicated tool. Because of the lower arrangement of front tube 96, the orientation of the inner pins 91 matches the positions of the slots in the central framework, such that no front or rear part of the concave has to be raised during assembly or disassembly operations. The removal of the outer concave section 83 further facilitates these operations by reducing the weight of the remaining concave components which have to be taken out. However it is observed that the presence of the outer concave section 83 does not constitute any hindrance for the access to the connection points of the concave assembly and that it is equally possible to use the concave rest structure 94 for installing or removing the complete concave assembly 78, including its movable section 83.

The chamber 26 of the threshing and separating assembly 16 has a rear portion including a separating concave assembly 101 disposed adjacent the threshing section 78 of tee rotor 27. This concave assembly comprises a plurality of interchangeable separating concaves or grates 102, 103. According to one embodiment, shown in FIG. 2, the concave assembly 101 comprises two more aggressive separating grates 102, each having three transverse curved members 106, one at the front, one in the middle and one at the rear of the grate 102. The curved members are interconnected by a set of spaced, longitudinally arranged slats 107, though which extend a plurality of curved wires 108. The slats 107 are rectangular in cross-section, having their longest side oriented to the axis of the rotor 27. The inward edges are engaged by the crop material for continued threshing action while separating the grain and chaff from the straw.

The inner ends of the curved members 106 have hooks 110 which fit over appropriate mounting means at the centre of the threshing and separating assembly 16. In one embodiment these mounting means may be longitudinal rods 112 mounted through transverse plates 113 of the central framework 111 of the separating assembly. At their outer ends the curved members 106 are welded to a longitudinal flat iron 114 which has apertures for appropriate means such as bolts 116 (FIG. 5) for attaching the outer section of the grate 102 to a profile 115 of the separating assembly. The separating grate 102 can be removed from the harvester 10 after removal of a side panel adjacent the separating concave assembly 101. The bolts 116 are removed such that the outer side of- the grate 102 can be lowered, whereafter the hooks 110 can be lifted off the central rod 112.

It is highlighted that the grate 102 and its mounting means 110, 114 are symmetrical with respect to the vertical middle plane of the grate, such that the same grate can be mounted without distinction to the left or right portion of the separating assembly 16. In this manner it is possible to extend the lifetime of the grates. The grates 102 will be worn most at their entrance, adjacent the threshing concave assemblies 78.

In another embodiment, shown in FIG. 3, the separating concave assembly 101' comprises two less aggressive separating grates 103. Each grate has three transverse curved members 106, similar to the curved members of the aggressive grates 102. The curved members are welded to a curved, perforated sheet 118. The perforations are rectangular in shape providing in-between a rectangular grid along which the straw is transported to the rear of the harvester 10. As with the other grates 102, the curved members 106 have at their inner ends mounting hooks 110. Along the outer side of the sheet 118 is welded a flat iron 114 for attachment of the grate to the profile 115. Also these grates are symmetrical with respect to their vertical middle plane, such that they can be installed at will on the left or on the right hand side of the concave assembly 101'.

Preferably, the length of each grate 103 is equal to the length of the aggressive grate 102. Accordingly, both grate types are perfectly interchangeable. It is equally possible to combine both grate types, as shown in FIG. 4. Herein the more aggressive grate 102 is installed upfront, adjacent the threshing concave assembly 78. Behind this separating grate is installed a separating grate 103 of the less aggressive type. The grate configuration of FIG. 2 is more adapted for handling crops which are hard to thresh. The configuration of FIG. 3 is used for crops which can be threshed and separated more easily and for fragile crop seeds such as peas or beans. The absence of longitudinal slats reduces the risks of broken grain kernels. The combination used in FIG. 4 can be chosen for crop conditions lying inbetween the two extremes. Accordingly, the present separating concave assembly provides a versatile arrangement which can be adapted to a wide range of crops and crop conditions.

What is claimed is:

1. A combine harvester comprising:
    a main frame;
    a threshing and separating arrangement mounted to said main frame said threshing and separating arrangement further comprises a left and right generally cylindrical chambers each having a rotor assembly mounted therein and left and right separating concave mounting means, said separating concaves and their mounting means are symmetrical with respect to their transverse middle plane, such that said separating concaves can be mounted invariably to the left or right chambers wherein said threshing and separating arrangement further comprises left and right generally cylindrical chambers each having a rotor assembly mounted therein, left and right threshing concaves and left and right threshing concave mounting means; and said left and fight threshing concaves and their mounting means are symmetrical with respect to their transverse middle plane, such that said threshing concaves can be mounted invariably to the left or right chambers, having:
        a generally cylindrical chamber having a generally longitudinal axis and comprising a separating concave assembly wherein at least one of said separating concaves further comprises a gate constituted by a set of spaced, longitudinally arranged slats and a set of curved wires extending transversely through said slats and wherein at least an additional separating concave further comprises a grate constituted by curved plate having substantially rectangular apertures therein; and
        a rotor assembly mounted for rotation in said chamber and comprising a generally cylindrical rotor body with a separating section associated with said separating concave assembly, wherein said separating concave assembly comprises at least two separating concaves, the one located behind the other; and said chamber having mounting means operable to receive and hold each of said choice of separating concaves and wherein said threshing concave assembly further comprises at least one removable concave;
        said harvester comprises a cleaning assembly arranged below said concave assembly
        said main frame includes an outer portion; and said combine harvester further comprises transverse rest means arranged between said outer portion and between said threshing and separating arrangement and said cleaning assembly for resting thereon said removable concave.

2. The combine harvester described in claim 1, wherein said rest means has an opening permitting free flow of threshed and separated crop material from said threshing and separating arrangement to said cleaning assembly.

3. The combine harvester described in claim 2, wherein said rest means further comprise a pair of supports extending transversely of the harvester between said side walls.

4. The combine harvester described claim 3, wherein said supports further comprise tubular members connected at their ends to side mounting members.

5. The combine harvester described claim 4, wherein the front tubular member extends at a lower level than the rear tubular member.

* * * * *